United States Patent [19]

Deb

[11] Patent Number: 4,983,839

[45] Date of Patent: Jan. 8, 1991

[54] PYROELECTRIC MATERIALS

[75] Inventor: Krishna K. Deb, Alexandria, Va.

[73] Assignee: The United States of America as represented by the Secretary of the Army, Washington, D.C.

[21] Appl. No.: 395,700

[22] Filed: Aug. 18, 1989

[51] Int. Cl.$^5$ ........................ C04B 35/46; H01J 31/49
[52] U.S. Cl. ................................ 250/338.3; 250/332; 250/338.2; 252/62.9; 501/136
[58] Field of Search ................. 250/333, 338.2, 338.3, 250/332; 252/62.9 R, 62.9 PZT; 501/136

[56] References Cited

U.S. PATENT DOCUMENTS

| 4,080,532 | 3/1978 | Hopper | 250/338.2 |
| 4,710,479 | 12/1987 | Yamanaka et al. | 501/75 |
| 4,764,492 | 8/1988 | Takeuchi et al. | 501/136 |

FOREIGN PATENT DOCUMENTS 63-86312  4/1988  Japan ................................. 501/136

*Primary Examiner*—Carolyn E. Fields
*Attorney, Agent, or Firm*—Milton W. Lee; John E. Holford; Anthony T. Lane

[57] ABSTRACT

The invention provides a new low Curie temperature pyroelectric material and related sensing devices based on lead titanate doped with various percentages of calcium, lanthanum, bismuth, cobalt and tungsten processed to provide a fine grain structure.

16 Claims, 3 Drawing Sheets

PYROELECTRIC MATERIALS

The invention described herein may be manufactured, used, and licensed by the U.S. Government for governmental purposes without the payment of any royalties thereon.

BACKGROUND OF INVENTION

1. Field

The present invention relates to pyroelectric materials, pyroelectric sensing devices which detect the temperature of objects from their radiations and pyroelectric imaging devices which portray objects by temperature differences between parts of the object and/or its surroundings.

2. Prior Art

The use of pyroelectric materials for infrared (IR) detection and thermal imaging is now a well established technology. This technology offers some distinct advantages over the rival technology of IR photoconductive detectors. Pyroelectric detectors require no refrigeration, therefore, imaging systems that use them are much less expensive and more portable. Such imaging systems, however, do not as yet match the brightness and definition provided by cooled photodiodes. To bridge this performance gap there is a need for pyroelectric detectors or sensors with much higher sensitivity and spatial resolution. The performance of materials used in integrated circuit pyroelectric arrays, thermistor type holometric arrays and vidicon TV cameras are generally compared by means of a Figure of Merit which takes into account the effects of frequency, noise and similar parameters on the systems performance. To have a high Figure of Merit (or good performance) pyroelectric materials must have a Curie temperature ($T_c$) near room temperature. To make thin inexpensive high definition arrays, suitable for use with silicon charge-coupled-devices (CCD's), it would be advantageous to make use of the more rugged ceramic type materials such as lead titanate which have high spontaneous polarization (75 Coul./cm$^2$), but which unfortunately normally have Curie temperatures near 500°C.

BRIEF DESCRIPTION OF THE DRAWINGS

The invention is best understood with reference to the drawings wherein:

FIGS. 3A-3C show the variation of spontaneous polarization ($\Delta P_S$) with temperature for the three new samples of FIGS. 2A-2C;

FIGS. 4A-4C show the variation in bulk resistance with temperature for the newer samples;

FIGS. 5A-5C show the variation in pyroelectric coefficient with temperature for the three new samples;

FIG. 7 shows a radiation sensor made from pyroelectric material;

FIG. 8 shows a resistance bolometer utilizing the sensor structure of FIG. 7;

FIG. 9 shows a capacitive type radiation meter utilizing the sensor of FIG. 7;

FIG. 10 shows a pixel element of an integrated circuit detector array for a pyroelectric imager using a charge-coupled-device (CCD) and sensors as shown in FIG. 7;

FIG. 11 shows the generalized structure of a vidicon utilizing sensor structures as shown in FIG. 7.

DESCRIPTION OF THE PREFERRED EMBODIMENT

Figure 1A:
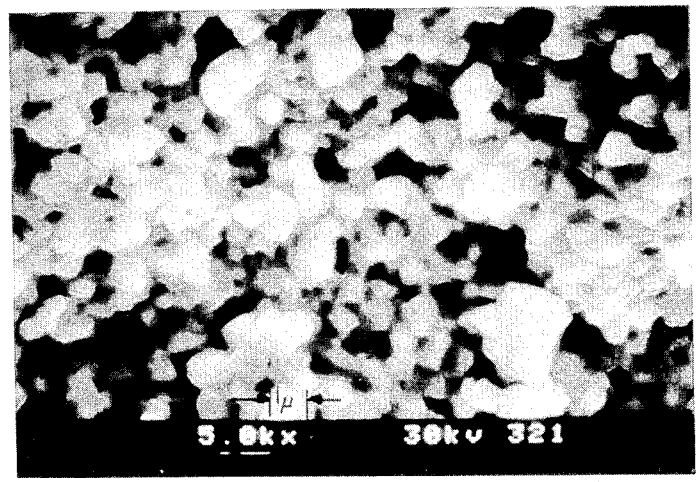
FIGS. 1A and 1B show microphotographs of two samples of lead-titanate prepared according to the present invention.
Figure 1B:
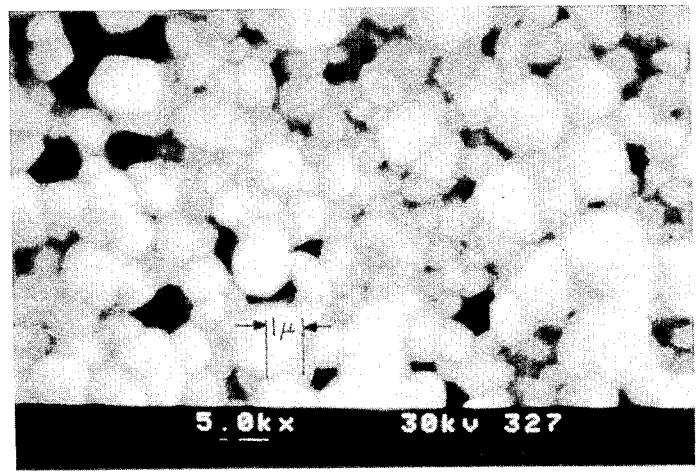
Figure 2A:
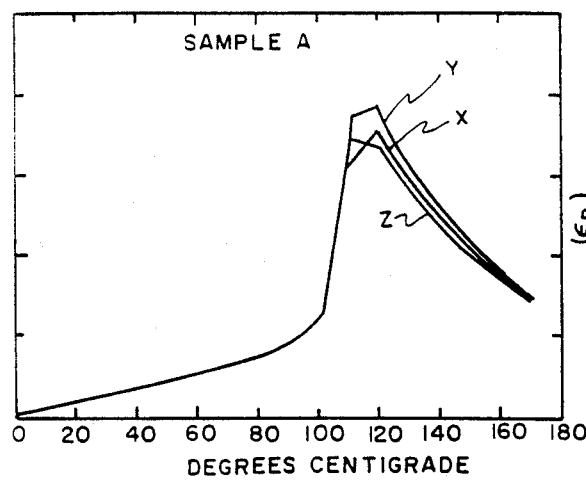
FIGS. 2A-2D show the variation of dielectric constant ($\epsilon_R$) with temperature at several different frequencies for four different lead-titanate samples, the last, 2D, being applicant's prior art.
Figure 2B:
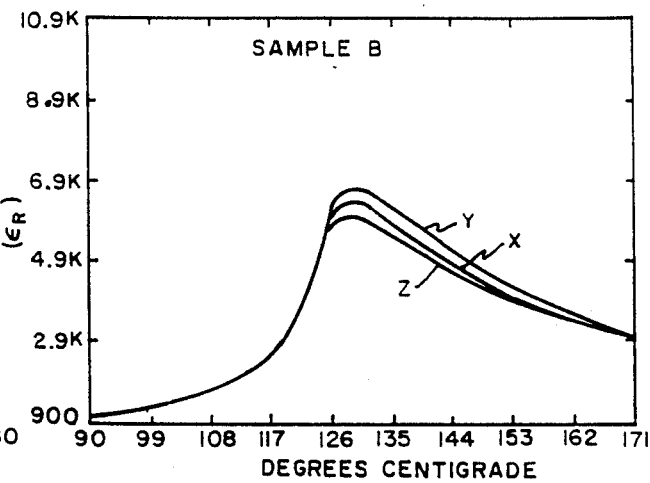
Figure 2C:
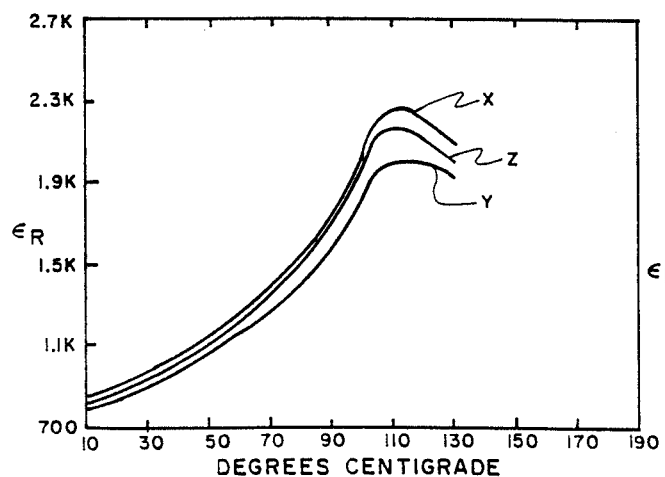
Figure 2D:
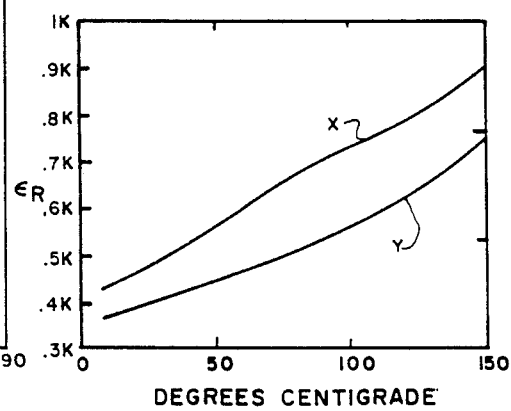

FIGS. 1A and 1B show electron micrographs of typical pyroelectric materials according to its present invention. Since the ceramic material should be sliced and polished to a wafer thickness of 25 μm or thinner for optimum detector performance, the average grain sizes of 1 to 2 microns are very suitable for wafer production and integrity. This invention undertook extensive ceramic processing research in order to derive preparation routes for finely grained agglomerates for ceramic preparation. It was found that low temperature metal alkoxide routes, in general, give very fine oxide powders ideally suited for sintering PbTiO$_3$, ceramics. One description of these techniques is given in the JOURNAL OF MATERIALS RESEARCH, Vol. 2, No. 5, Sept/Oct 1987, pp 588-589.

FIGS. 2A-2D show the variation in dielectric constant ($\epsilon_R$) with temperature for samples A, B, C, and D, respectively. The composition, density (gm/cc) and Curie temperature of these samples are listed in Table 1. Approximately 20-30 percent of the lead is replaced, chiefly with calcium, to reduce the Curie temperatures. Lanthanum and bismuth replace a small percentage of the lead to improve the poling properties of the samples. Oxides of cobalt and tungsten replace a small percentage of the titanate to increase the hardness of the samples and thereby improve their resistance to fracture. Curve x was measured at a frequency of 0.1 KHz, curve y at 100 KHz and curve Z at 1 KHz with a biasing electric field of 500 V/cm. It can be seen that with increasing temperature the value of $\epsilon_R$ increases gradually, but there is very little dependence on frequency below the Curie temperature where the curves peak. Pure lead titanate has a room temperature $\epsilon_R$ value of 180 as compared with the near 1000 values of samples A, B and C.

TABLE I

| SAMPLE | COMPOSITION | DENSITY | CURIE TEMP. |
|---|---|---|---|
| A | Pb$_{0.70}$Ca$_{0.30}$Ti$_{0.96}$(Co$_{0.5}$W$_{0.5}$)$_{.04}$O$_3$ | 6.32 | 106° C. |
| B | Pb$_{0.80}$Ca$_{0.20}$Ti$_{0.96}$(Co$_{0.5}$W$_{0.5}$)$_{.04}$O$_3$ | 6.70 | 118° C. |
| C | (Pb$_{0.62}$Ca$_{0.30}$La$_{0.06}$Bi$_{0.02}$)Ti$_{0.98}$O$_3$ | 6.72 | 94° C. |
| D | (Pb$_{0.74}$Ca$_{018}$La$_{0.06}$Bi$_{0.02}$)Ti$_{0.98}$O$_3$ | 7.12 | 238° C. |

Sample D is a less modified (18% Ca) ceramic with an $\epsilon_R$ of about 500 at room temperature, tested by the applicant at an earlier date. A report on this material may be found in Ferroelectrics, 1988, Vol. 88, pp. 167-176. This sample did not lower the Curie temperature sufficiently for practical application to near room temperature sensors.

FIGS. 3A-3C show the variation in spontaneous polarization in coulombs/cm$^2$ versus temperature for the three samples, respectively. All have a maximum sensitivity in the range from 90° to 120°. Sample C exhibits the smallest peak polarity change, but has its maximum sensitivity ten to twenty percent closer to room temperature. The values shown are for the poled material, and all samples, by virtue of their composition were effectively poled for maximum pyroelectric effect.

FIGS. 4A–4C show the bulk dc-resistivity in ohms per cm versus temperature for the samples. All of these materials show a marked decrease in resistance with temperature as they approach their Curie temperatures. This characteristic makes these materials suitable for use in negative coefficient thermistors. The resistivity of these ceramics is always several orders of magnitude higher than the megohm/cm value of the lead titanate single crystal. This higher value permits the elimination of the usual gate bias resistor in integrated circuit type infrared image detector arrays, thus facilitating the matching of detector arrays to the compact architecture of silicon CCDs.

FIGS. 5A–5C show the pyroelectric coefficient in coulombs per $cm^2$ multiplied by the temperature (C°) for the materials as a function of temperature. These curves clearly exhibit the high sensitivity peaks which occur at the samples' Curie temperatures. These new improved materials put the Curie point within 70° of room temperature whereas the last previous improvement, sample D, still put this point more than 200° away from room temperature. Thus in systems where the sensor is heated to provide a temperature bias for greatest sensitivity, these materials are much more efficient, though admittedly it would be even better to operate much closer to room temperature, and perhaps eliminate the need for any bias. The high density values shown in Table I are a result of the careful processing routes to provide a fine grain structure. This considerably reduces the dielectric loss (tan $\delta$) particularly at low frequencies. It can be seen that, as the calcium was substituted for lead, the value of $\epsilon_R$ increased significantly while tan $\delta$ remained almost the same. This increased $\epsilon_R$ apparently came from the decreased Curie temperature due to the calcium substitution. In all samples the values of tan $\delta$ are very small at room temperature, being of the order of $10^{-2}$. The lower tan $\delta$ is conducive to improved detectivity.

Figure 6:
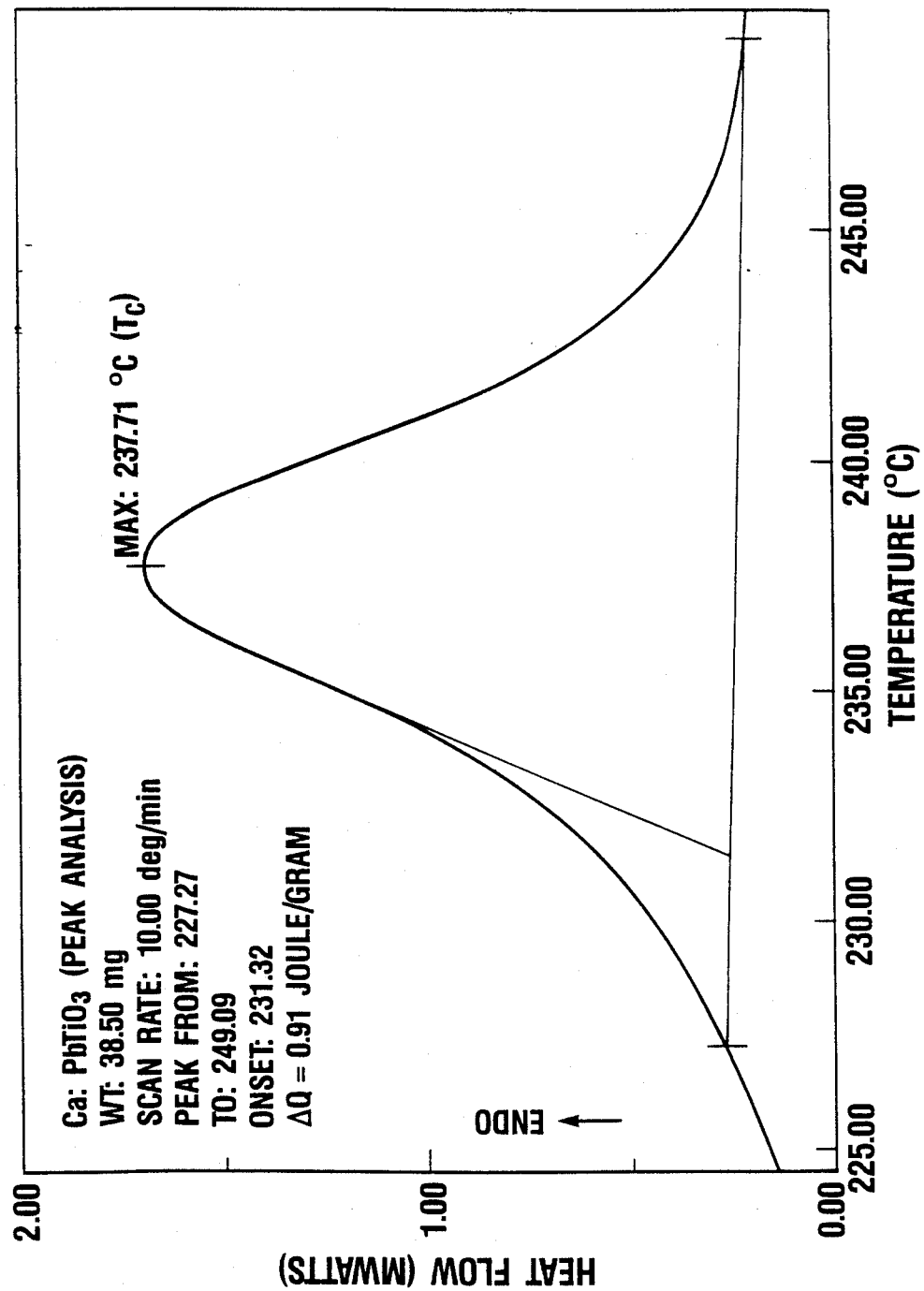
FIG. 6 shows a thermogram of the prior art sample mentioned at FIG. 2D above.

FIG. 6 shows a thermogram used to accurately determine the Curie temperature of sample D. The transition heat $\Delta Q$ associated with the ferroelectric paraelectric phase transition was endothermic for all samples A–D and their broad nature in the Cp-t curve was similar to other ferroelectrics giving second order phase transition. The values in Table I were obtained from a similar analysis of the other samples. Table 2 lists the Figure of Merit, $F_v$, which is $Pi/\rho Cp\epsilon_R$, of several Ca-doped PbTiO, materials as compared to the currently used Barium-Stromium-Titanate ceramics or Potassium-Niobate-Tantalate single crystal. These Figures of Merit were calculated from the material constants and are included in the Table. This Figure of Merit relates material properties to performance when an external voltage noise limits performance and is applicable to CCD coupling.

TABLE II

| SAMPLE | CURIE TEMP. (°C.) | FIGURE OF MERIT*** | HARDNESS |
|---|---|---|---|
| A | 106 | 4.90 | EXCELLENT |
| B | 118 | 3.33 | EXCELLENT |
| C | 94 | 0.60 | GOOD |
| D | 238 | NOT DETERMINED | GOOD |
| BST* (CERAMIC) | 23 | 0.27 | POOR |
| KTN** CRYSTAL | 23 | 0.92 | FAIR |

*BARIUM STRONTIUM TITANATE
**POTASSIUM NIOBATE TANTALATE
***$F_v = P_i/\rho C_p \epsilon R$ The present materials show reasonably high values of $F_v$, which make them excellent candidates for composite pyroelectric sensor/CCD scanner array.

FIG. 7 shows a sensor element 70 made from a wafer of ferroelectric material as previously disclosed. The thickness H of the wafer is chosen thick enough to permit complete interaction with penetrating infrared radiation incident thereon, but still thin enough to confine the heat flow until maximum polarization is obtained. The broad surfaces are covered with layers 72 and 73 of conductive material, one of which obviously must be transparent or discontinous to pass the IR radiation. These layers accumulate surface charge resulting from the pyroelectric effect which can be removed by leads 74 and 75 to a remote set of terminals 76 and 77.

FIG. 8 shows a bolometer or thermistor arrangement wherein a battery 81 and an ammeter 82 are serially connected to measure the DC resistance between the terminals of an element 80 similar to that shown in FIG. 7. The meter reading will vary as a function of the incident radiation.

FIG. 9 shows a capacitance metering arrangement wherein the pyroelectric sensor 90 is connected in parallel with an inductor 91 to form a resonant tank circuit. Oscillator 92 feeds the inductor through a transformer coupling 91A and an ammeter 93. As the oscillator is tuned to the resonant frequency of the tank circuit the ammeter peaks sharply. The oscillator frequency causing the peak current is thus a function of the incident radiation, as the radiation varies the dielectric constant of the sensor.

FIG. 10 shows a portion of a pyroelectric sensor array as used in solid state infrared imagers. The array consists of a plurality of small pyroelectric elements such as 101 mounted on a membrane 102. The outer layer 102 A of the membrane is an absorber such as lampblack in a suitable binder to efficiently absorb the incoming radiation without reflection. Under the absorber layer is a support layer 102 and a thin common electrical conductive layer 103. Each pyroelectric element also has an individual conductive element 103 to neutralize only the accumulated surface charge of that element. A separate conductive metal connector 104 is attached only to a small area of each individual element 103 and otherwise separated from it by a heat insulator 105 to enhance the pyroelectric effect. The metal connector is bonded to a sensor soldering terminal 107 which is electrically connected by a solder bridge 106 to a CCD soldering terminal 108. The CCD terminal is bonded to a charge storage element 109 on the silicon substrate 110 of an appropriate CCD readout device.

FIG. 11 shows the general structure of a pyroelectric vidicon using the material of the present invention. The material is incorporated into an array 111 similar to that shown in FIG. 10 without the CCD structure. The array is mounted so that the layer 102C forms the anode 112 of the vidicon at the viewing end of the glass vacuum envelope 113. The usual video circuits generate the needed voltages for the anode and electron gun 115.

The electron stream from the gun neutralizes the pyroelectric surface charge as it develops and the video circuits generate a video type output signal based on the resulting deficit in electrons returning from the anode.

I claim:

1. An improved pyroelectric material comprising:
   modified lead titanate having an average grain size between 1 and 2 microns and wherein at least twenty percent of the lead has been replaced by calcium to lower the temperature at which the pyroelectric coefficient peaks occur and thus provide an improved Figure of Merit.

2. A pyroelectric material according to claim 1 wherein: the composition of said material is $Pb_{0.70}Ca_{0.30}Ti_{0.96}(Co_{0.5}W_{0.5})_{0.4}O_3$.

3. A pyroelectric material according to claim 1 wherein: the composition of said material is $Pb_{0.80}Ca_{0.20}Ti_{0.96}(Co_{0.5}W_{0.5})_{0.4}O_3$.

4. A pyroelectric material according to claim 1 wherein: the composition of said material is $(Pb_{0.62}Ca_{0.30}La_{0.06}Bi_{0.02})Ti_{0.98}O_3$.

5. An electromagnetic radiation sensor comprising:
   a thin plate of lead-calcium-titanate having an average grain size between 1 and 2 microns, a thickness of approximately 25 microns and an atomic ratio of lead to calcium no greater than 4;
   said plate being electrically polarizable normal to its broad surfaces; and
   a separate electrode of highly conductive material intimately contacting each of the two opposed broad surfaces of said plate to form an anode and a cathode.

6. A sensor according to claim 5 further including means to measure the change in resistance between said anode and cathode as a function of radiation incident on said plate.

7. A sensor according to claim 5 further including means to measure the change in capacitance between said anode and said cathode as a function of radiation incident on said plate.

8. A sensor according to claim 5 further including:
   means to measure the change in electric polarization of said plate in response to incident radiation on said plate.

9. A sensor according to claim 5 wherein:
   said ratio of lead to calcium is 7/3.

10. A sensor according to claim 5 wherein:
    about four percent of said titanate is replaced by oxides of cobalt and tungsten.

11. A sensor according to claim 5 wherein said lead-calcium-titanate contains approximately eight mole percent of lanthanum and bismuth.

12. A pyroelectric imager with an array of ferroelectric sensors, wherein:
    each sensor includes a thin layer of lead-calcium-titanate having an average grain size between 1 and 2 microns, a thickness of approximately 25 microns and an atomic ratio of lead to calcium less than four.

13. An imager according to claim 12 wherein:
    said atomic ratio of lead to calcium is 7/3.

14. An imager according to claim 12 wherein:
    said lead-calcium-titanate contains approximately four mole percent of cobalt and tungsten.

15. An imager according to claim 13 wherein:
    said lead-calcium-titanate contains approximately four mole percent of cobalt and tungsten.

16. An imager according to claim 13 wherein:
    some of said lead in said sensor is replaced by approximately eight mole percent of lanthanum and bismuth.

* * * * *